(12) United States Patent
Haut et al.

(10) Patent No.: US 10,442,453 B2
(45) Date of Patent: Oct. 15, 2019

(54) CHILD STROLLER APPARATUS

(71) Applicant: Wonderland Switzerland AG, Steinhausen (CH)

(72) Inventors: Robert E. Haut, Merion Station, PA (US); Andrew J. Taylor, Mohnton, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 15/963,731

(22) Filed: Apr. 26, 2018

(65) Prior Publication Data

US 2018/0312188 A1 Nov. 1, 2018

Related U.S. Application Data

(60) Provisional application No. 62/490,318, filed on Apr. 26, 2017.

(51) Int. Cl.
*B62B 9/12* (2006.01)
*B62B 7/06* (2006.01)
(Continued)

(52) U.S. Cl.
CPC ............... *B62B 9/12* (2013.01); *B62B 7/008* (2013.01); *B62B 7/062* (2013.01); *B62B 7/064* (2013.01);
(Continued)

(58) Field of Classification Search
CPC .. B62B 9/12; B62B 9/28; B62B 7/142; B62B 7/008; B62B 7/062; B62B 7/08;
(Continued)

(56) References Cited

U.S. PATENT DOCUMENTS

| 7,032,922 B1* | 4/2006 | Lan | B62B 7/08 |
| | | | 280/643 |
| 7,658,399 B2* | 2/2010 | Van Dijk | B62B 7/142 |
| | | | 280/30 |

(Continued)

FOREIGN PATENT DOCUMENTS

| CN | 101954920 A | 1/2011 |
| DE | 202005008211 U1 | 10/2005 |

(Continued)

OTHER PUBLICATIONS

The Sep. 21, 2018 Search Report from co-pending EP Patent Application No. 18169546.1.

*Primary Examiner* — Erez Gurari
(74) *Attorney, Agent, or Firm* — NZ Carr Law Office, PLLC (57) ABSTRACT

A child stroller apparatus includes a stroller frame, and an adapter assembled with the stroller frame and having a first coupling portion and a second coupling portion, each of the first and second coupling portions being configurable as a mount for installation of a detachable part. The adapter is movable relative to the stroller frame to displace the first and second coupling portions, a first position of the adapter configuring the first coupling portion as the mount while maintaining an angle between the first coupling portion and the second coupling portion, and a second position of the adapter configuring the second coupling portion as the mount while maintaining the angle between the first coupling portion and the second coupling portion.

30 Claims, 12 Drawing Sheets

(51) Int. Cl.
*B62B 7/08* (2006.01)
*B62B 7/10* (2006.01)
*B62B 7/00* (2006.01)
*B62B 7/14* (2006.01)
*B62B 9/28* (2006.01)

(52) U.S. Cl.
CPC .................. *B62B 7/08* (2013.01); *B62B 7/10* (2013.01); *B62B 7/142* (2013.01); *B62B 9/28* (2013.01); *B62B 2205/003* (2013.01); *B62B 2205/24* (2013.01)

(58) Field of Classification Search
CPC ....... B62B 7/064; B62B 7/10; B62B 2205/24; B62B 2205/003
See application file for complete search history.

(56) References Cited

U.S. PATENT DOCUMENTS

| | | | | |
|---|---|---|---|---|
| 8,967,171 | B2* | 3/2015 | Horst | B62B 5/0013 135/88.02 |
| 9,108,659 | B2* | 8/2015 | Sparling | B62B 9/12 |
| 9,433,304 | B2* | 9/2016 | Mountz | A47D 13/105 |
| 2013/0113188 | A1* | 5/2013 | Liao | B62B 7/08 280/650 |
| 2015/0048599 | A1* | 2/2015 | Liu | B62B 7/08 280/642 |
| 2015/0183450 | A1* | 7/2015 | Chen | B62B 7/142 280/47.35 |
| 2015/0191108 | A1* | 7/2015 | Zhang | B60N 2/2848 297/250.1 |
| 2015/0217792 | A1* | 8/2015 | Stiba | B62B 7/008 280/650 |
| 2017/0267272 | A1* | 9/2017 | Gao | B62B 7/062 |
| 2017/0334476 | A1* | 11/2017 | Paxton | B62B 7/142 |
| 2018/0312188 | A1* | 11/2018 | Haut | B62B 7/062 |

FOREIGN PATENT DOCUMENTS

| | | |
|---|---|---|
| EP | 1826094 A1 | 8/2007 |
| EP | 2915459 A1 | 9/2015 |
| WO | 2016075479 A1 | 5/2016 |

* cited by examiner

CHILD STROLLER APPARATUS

CROSS-REFERENCE TO RELATED APPLICATION(S)

This application claims priority to U.S. Provisional Patent Application No. 62/490,318 filed on Apr. 26, 2017, the disclosure of which is incorporated herein by reference.

BACKGROUND

1. Field of the Invention

The present invention relates to child stroller apparatuses.

2. Description of the Related Art

Caregivers usually rely on a stroller apparatus to transport babies and children. A stroller apparatus is typically constructed from a metal frame that comprises the assembly of metal and plastic parts, and a fabric element that connects or wraps around the metal frame. When it is unused, the stroller apparatus can be collapsed for convenient storage or transport.

Some existing stroller apparatus may be configurable to include one or multiple seats so as to be able to transport one or more children at a time. However, a stroller apparatus accommodating multiple seats can have a very large frame structure, which can be difficult to maneuver, store and transport.

Therefore, there is a need for a child stroller apparatus that can be convenient to operate, and address at least the foregoing issues.

SUMMARY

The present application describes a child stroller apparatus that is convenient to operate, and has a mount system configurable to accommodate various detachable parts, such as one or two detachable child seats.

According to one aspect, the child stroller apparatus includes a stroller frame, and an adapter assembled with the stroller frame and having a first coupling portion and a second coupling portion, each of the first and second coupling portions being configurable as a mount for installation of a detachable part. The adapter is movable relative to the stroller frame to displace the first and second coupling portions, a first position of the adapter configuring the first coupling portion as the mount while maintaining an angle between the first coupling portion and the second coupling portion, and a second position of the adapter configuring the second coupling portion as the mount while maintaining the angle between the first coupling portion and the second coupling portion.

According to another aspect, the child stroller apparatus includes a stroller frame, and a first and a second adapter respectively assembled with the stroller frame at a front and a rear position, each of the first and second adapter being respectively connectible with a detachable child seat placed in a rearward facing position or a forward facing position. The first adapter has a first coupling portion and a second coupling portion, each of the first and second coupling portions being configurable as a mount for installation of a detachable child seat, the first adapter being movable relative to the stroller frame to displace the first and second coupling portions, a first position of the first adapter configuring the first coupling portion as the mount while maintaining an angle between the first coupling portion and the second coupling portion, and a second position of the first adapter configuring the second coupling portion as the mount while maintaining the angle between the first coupling portion and the second coupling portion.

DETAILED DESCRIPTION OF THE EMBODIMENTS

Figure 1:
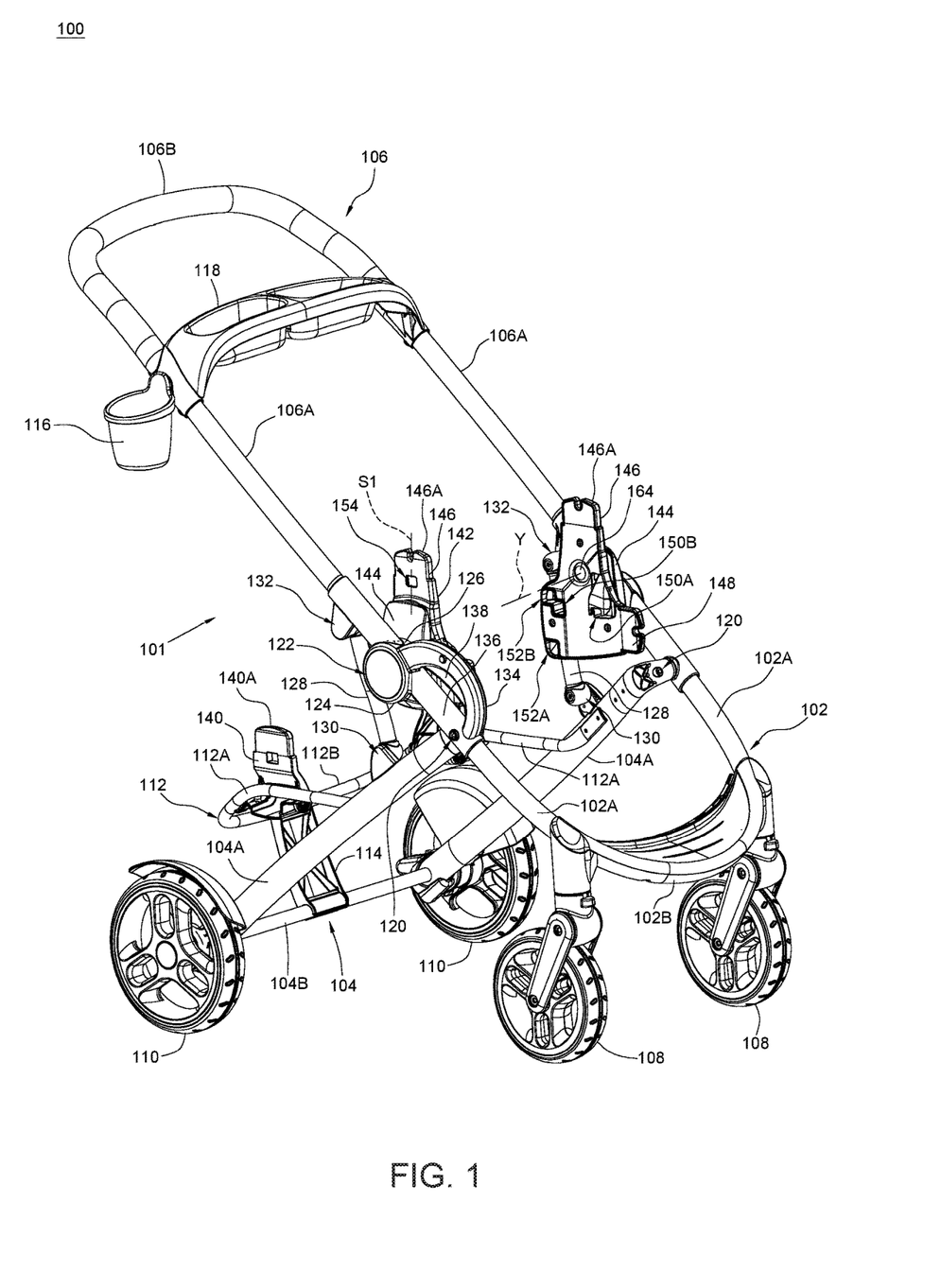
FIG. 1 is a perspective view illustrating an embodiment of a child stroller apparatus including a mount system in a first configuration.

FIG. 1 is a perspective view illustrating an embodiment of a child stroller apparatus 100. Referring to FIG. 1, the child stroller apparatus 100 can include a stroller frame 101 comprised of a front leg frame 102, a rear leg frame 104 and a push handle frame 106. According to an example of construction, the front leg frame 102, the rear leg frame 104 and the push handle frame 106 may be formed by tubular structures. The front leg frame 102 can include two side segments 102A respectively disposed at a left and a right side of the child stroller apparatus 100, and a transversal portion 102B connected with the two side segments 102A. A lower portion of the front leg frame 102 can provided with a plurality of wheel assemblies 108.

The rear leg frame 104 can include two side segments 104A respectively disposed at a left and a right side of the child stroller apparatus 100, and a transversal segment 104B connected with the two side segments 104A. A lower portion of the rear leg frame 104 can provided with a plurality of wheel assemblies 110. Moreover, the rear leg frame 104 can further be connected with a rear support frame 112. According to an example of construction, the rear support frame 112 may have a generally U-shape including two side segments 112A respectively connected with the two side segments 104A of the rear leg frame 104, and a transversal segment 112B connected with the two side segments 112A. The rear support frame 112, including the two side segments 112A and the transversal segment 112B, may be formed as an unitary part. A bracket 114 may be respectively connected with the transversal segment 112B of the rear support frame 112 and the transversal segment 104B of the rear leg frame 104 to provide further support for the rear support frame 112.

The push handle frame 106 can include two side segments 106A respectively disposed at a left and a right side of the child stroller apparatus 100, and a transversal segment 106B connected with the two side segments 106A. A cup holder 116 and a tray 118 may be connected with the side segments 106A at an elevated position for an adult's use.

At each of the left and right side of the child stroller apparatus 100, a same assembly structure is applied for connecting the front leg frame 102, the rear leg frame 104 and the push handle frame 106. More specifically, an upper end of the side segment 104A is pivotally connected with the corresponding side segment 102A via a pivot connection 120, whereby the front leg frame 102 and the rear leg frame 104 are rotatable relative to each other about the pivot connections 120. Each pivot connection 120 can include, e.g., a pivot shaft assembled through the side segments 102A and/or 104A. The side segment 102A of the front leg frame 102 can be pivotally connected with the corresponding side segment 106A of the push handle frame 106 via a pivot connection 122, whereby the front leg frame 102 and the push handle frame 106 are rotatable relative to each other about the pivot connections 122. According to an embodiment, each pivot connection 122 includes a shell portion 124 fixedly connected with the side segment 102A of the front leg frame 102, and another shell portion 126 fixedly connected with the side segment 106A of the push handle frame 106 that is pivotally connected with the shell portion 124. Moreover, each of the left and right side of the child stroller apparatus 100 respectively includes a linking bar 128, which is respectively connected pivotally with the side segment 104A of the rear leg frame 104 and the side segment 106A of the push handle frame 106 via two pivot connections 130 and 132. In this manner, the rear leg frame 104 and the push handle frame 106 can be movably coupled to each other for facilitating folding and unfolding of the child stroller apparatus 100.

Referring to FIG. 1, the child stroller apparatus 100 can further include a grip portion 134 for facilitating operation of the child stroller apparatus 100 with one hand. For example, the outer shape of the grip portion 134 can define at least partially a concavity for facilitating grasping of the grip portion 134 with one hand. The grip portion 134 is made of a rigid material, which can include, without limitation, rigid plastics, metal, and the like. The grip portion 134 is disposed adjacent to the shell portion 124, and extends below the shell portion 124. For example, the grip portion 134 can have a curved outer shape with two ends respectively adjacent to the shell portion 124 and the pivot connection 120 coupling the side segment 102A to the side segment 104A, the grip portion 134 protruding forward from the shell portion 124 and the side segment 102A.

According to an example of construction, the shell portion 124 and the grip portion 134 can be respectively connected fixedly with a sleeve 136, the shell portion 124 being disposed at an end of the sleeve 136 and the grip portion 134 having two ends respectively connected with the shell portion 124 and the sleeve 136. The shell portion 124, the grip portion 134 and the sleeve 136 can form a unitary part that can be fixedly connected with the side segment 102A by fastening the side segment 102A through the sleeve 136, the shell portion 124 and the grip portion 134 being thereby fixedly connected with the side segment 102A. The grip portion 134 can be easily accessible, and provide convenient holding for lifting the child stroller apparatus 100 above a floor surface during folding operation.

As shown in FIG. 1, the grip portion 134 may be assembled with a release actuator 138 that is operatively coupled to a latch mechanism (not shown) disposed in the pivot connection 122 between the shell portions 124 and 126. The release actuator 138 is operable to cause unlocking of the pivot connection 122 for folding of the child stroller apparatus 100.

Referring to FIG. 1, the child stroller apparatus 100 can further include a mount system comprised of a plurality of adapters 140 and 142 assembled with the stroller frame 101 for installation of one or two detachable parts as desired. More specifically, two adapters 140 may be respectively provided on the two side segments 112A of the rear support frame 112 at a rear position on the stroller frame 101, and two adapters 142 may be respectively provided on the two side segments 106A of the push handle frame 106 at a front position on the stroller frame 101. Examples of detachable parts that may be installed on the adapters 140 and 142 can include, without limitation, detachable child seats such as child stroller seats and child safety seats, bassinets, storage components such as baskets, and the like.

The two adapters 140 can be similar in construction, and are configured to receive the installation of a detachable part at a rear position on the stroller frame 101. According to an example of construction, the two adapters 140 may be respectively pivotally connected with the two side segments 112A of the rear support frame 112. Each of the two adapters 140 is thereby rotatable relative to the rear support frame 112 between a use position (better shown in FIGS. 1 and 2) where a coupling portion 140A of the adapter 140 protrudes upward from the side segment 112A of the rear support frame 112 for engagement with a detachable part, and an unused position (as better shown in FIG. 11) where the coupling portion 140A protrudes downward from the side segment 112A of the rear support frame 112 for disabling engagement of a detachable part. The coupling portion 140A may have a symmetric shape so as to be able to receive the engagement of a detachable part in different orientations. For example, a detachable child seat may be engaged with the coupling portion 140A in a rearward facing position or a forward facing position as desired.

Referring to FIG. 1, the two adapters 142 can be similar in construction, and are configured to receive the installation of a detachable part at a front position on the stroller frame 101. The two adapters 142 may be disposed higher than the adapters 140 on the stroller frame 101. According to an embodiment, the two adapters 142 can be respectively connected pivotally with the two side segments 106A of the push handle frame 106 about a pivot axis Y extending transversally from a left side to a right side of the stroller frame 101. For example, each side segment 106A of the push handle frame 106 can be fixedly connected with a support bracket 144, and the corresponding adapter 142 can be pivotally connected with the support bracket 144 about the pivot axis Y. According to an example of construction, the adapter 142 may be disposed adjacent to the pivot connection 122 that couples the front leg frame 102 to the push handle frame 106.

Each adapter 142 has at least two coupling portions 146 and 148 that can respectively serve as a mount for installing a detachable part. According to an example of construction, the adapter 142 including the two coupling portions 146 and 148 can be provided as a rigid unitary part. The two coupling portions 146 and 148 can protrude in different directions on the adapter 142. For example, the coupling portion 146 can protrude and extend along a radial direction relative to the pivot axis Y, and the coupling portion 148 can protrude at a side of the coupling portion 146. Each adapter 142 is rotatable about the pivot axis Y relative to the stroller frame 101 to displace the two coupling portions 146 and 148 in a concurrent manner for modifying the orientation of the two coupling portions 146 and 148. Either of the two coupling portions 146 and 148 can be thereby selectively configurable as a mount protruding upward for installing a detachable part, wherein each of the coupling portions 146 and 148 can respectively have a symmetric shape so as to be able to engage with a detachable part installed in different orientations. For example, a detachable child seat may be engaged with any of the coupling portions 146 and 148 in a rearward facing position or a forward facing position as desired.

FIG. 1 illustrates the child stroller apparatus 100 with each adapter 142 in a first position where the coupling portion 146 protrudes upward while the coupling portion 148 protrudes forward. The first position of the adapter 142 shown in FIG. 1 configures the coupling portion 146 as the mount, while maintaining an angle between the coupling portion 146 and the coupling portion 148. According to some embodiment, a detachable part may further be engageable with the coupling portion 148 while the adapter 142 is in the first position.

Figure 2:
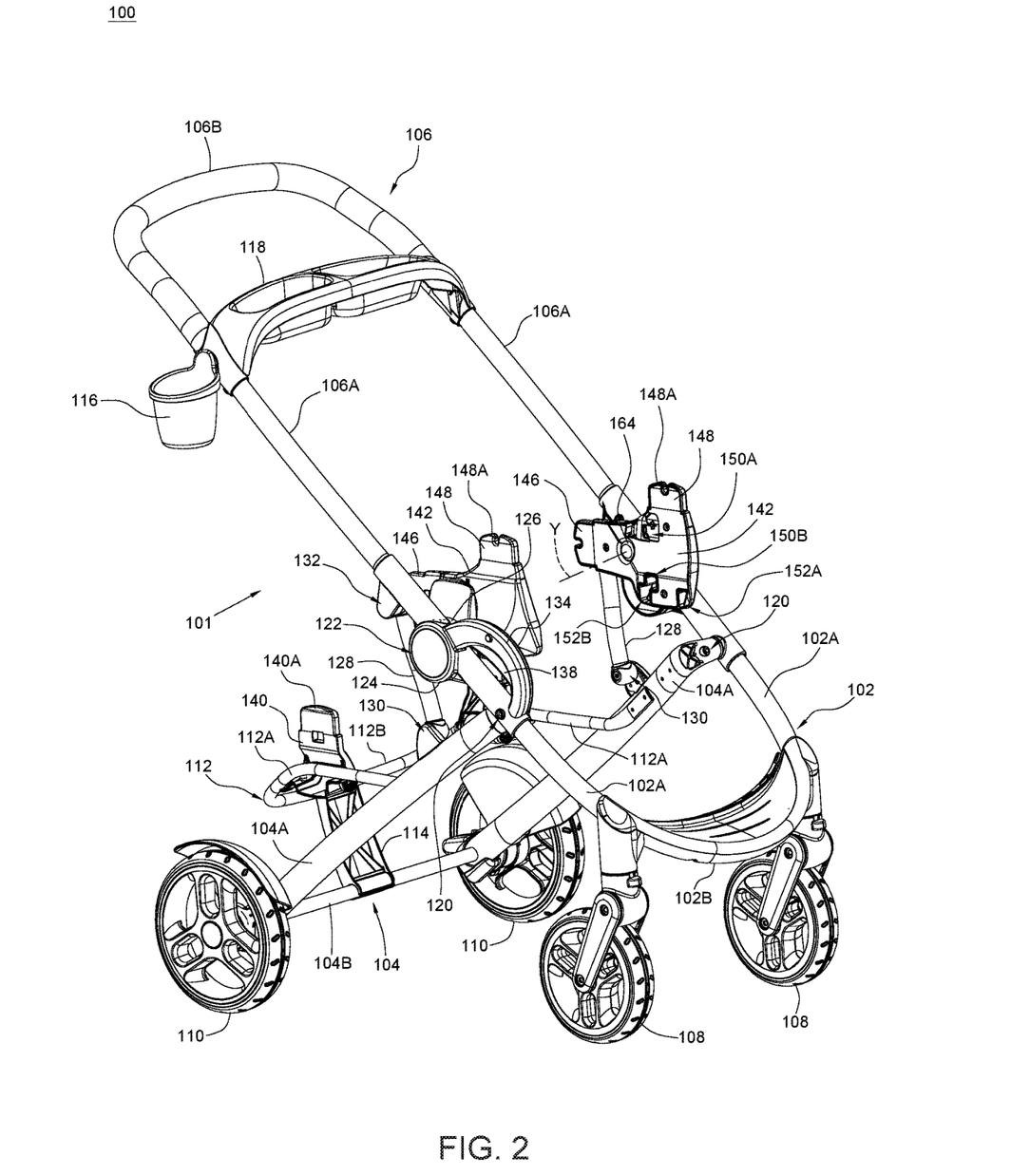
FIG. 2 is a perspective view of the child stroller apparatus with the mount system in a second configuration.

FIG. 2 illustrates the child stroller apparatus 100 with each adapter 142 in a second position where the coupling portion 148 protrudes upward while the coupling portion 146 protrudes rearward. According to an embodiment, the adapter 142 may be rotatable about 90 degrees between the first position shown in FIG. 1 and the second position shown in FIG. 2. Moreover, a top 148A of the coupling portion 148 in the second position of the adapter 142 (better shown in FIG. 2) can be at a substantially same height as a top 146A of the coupling portion 146 in the first position of the adapter 142 (better shown in FIG. 1). The second position of the adapter 142 shown in FIG. 2 configures the coupling portion 148 as the mount, while maintaining the angle between the coupling portion 146 and the coupling portion 148. According to some embodiment, a detachable part may further be engageable with the coupling portion 146 while the adapter 142 is in the second position.

According to an embodiment, the mount formed by the coupling portion 148 in the second position of the adapter 142 can be located forward relative to the mount formed by the coupling portion 146 in the first position of the adapter 142. This can be achieved by, for example, disposing the coupling portion 148 offset from the pivot axis Y of the adapter 142 at a side opposite to that of the coupling portion 146. As a result, a detachable part engaged with the adapters 142 in the second position can be shifted forward on the stroller frame 101 so as to leave more space for installing a second detachable part on the adapters 140.

Figure 3:
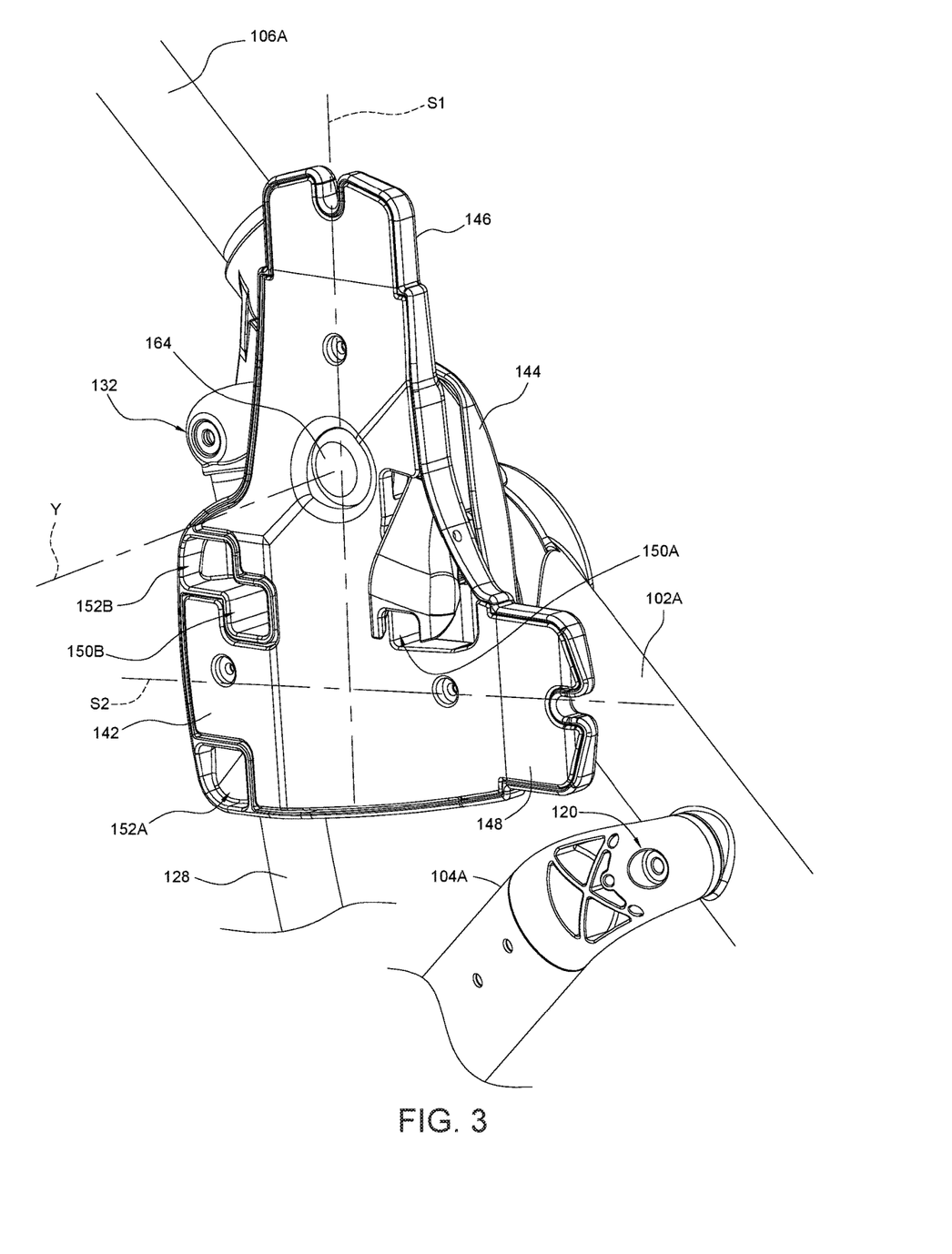
FIG. 3 is an enlarged perspective view illustrating some construction details of an adapter provided in the mount system of the child stroller apparatus.

In conjunction with FIGS. 1 and 2, FIG. 3 is an enlarged perspective view illustrating some construction details provided on one adapter 142. Referring to FIGS. 1-3, the adapter 142 can include different structural features for receiving the engagement of different detachable parts in the first and second positions shown in FIGS. 1 and 2. According to an example of construction, the adapter 142 may include two openings 150A and 150B that can be used for engagement with a detachable child safety seat when the adapter 142 is in the first position shown in FIG. 1. The two openings 150A and 150B may be disposed at two sides of an axis of symmetry S1 of the coupling portion 146, and can be located below the pivot axis Y of the adapter 142 when the child stroller apparatus 100 is in an unfolded state for use with the adapter 142 in the first position. The coupling portion 146 of the adapter 142 in the first position can insert into a socket provided on a detachable child safety seat with a latch or fitting structure provided on the detachable child safety seat engaging with either of the two openings 150A and 150B. For example, the opening 150A can receive the engagement of a latch provided on a detachable child safety seat that is installed on the adapter 142 in a rearward facing position, and the opening 150B can receive the engagement of a latch provided on a detachable child safety seat that is installed on the adapter 142 in a forward facing position.

Moreover, the adapter 142 may include two openings 152A and 152B that can be used for engagement with a detachable child safety seat when the adapter 142 is in the second position shown in FIG. 2. The two openings 152A and 152B may be disposed at two sides of an axis of symmetry S2 of the coupling portion 148, and can be located below the pivot axis Y of the adapter 142 when the child stroller apparatus 100 is in an unfolded state for use with the adapter 142 in the second position. The coupling portion 148 of the adapter 142 in the second position can insert into a socket provided on a detachable child safety seat with a latch or fitting structure provided on the detachable child safety seat engaging with either of the two openings 152A and 152B. According to an embodiment, the two openings 152A and 152B of the adapter 142 in the second position shown in FIG. 2 can spatially correspond to the two openings 150A and 150B of the adapter 142 in the first position shown in FIG. 1 so as to allow similar installation of a child safety seat in a rearward facing position or a forward facing position. For example, the opening 152A can receive the engagement of a latch provided on a detachable child safety seat that is installed on the adapter 142 in a rearward facing position, and the opening 152B can receive the engagement of a latch provided on a detachable child safety seat that is installed on the adapter 142 in a forward facing position.

Referring to FIG. 1, the adapter 142 may further include an opening 154 that can be used for engagement with a detachable child stroller seat when the adapter 142 is in the first position shown in FIG. 1. The opening 154 may be disposed on the axis of symmetry S1 of the coupling portion 146, and can be located on the coupling portion 146 above the pivot axis Y of the adapter 142 when the child stroller apparatus 100 is in an unfolded state for use with the adapter 142 in the first position. The coupling portion 146 of the adapter 142 in the first position can insert into a socket provided on a detachable child stroller seat with a latch or fitting structure provided on the detachable child stroller seat engaging with the opening 154. A detachable child stroller seat can be thereby installed on the adapter 142 in a rearward facing position or a forward facing position as desired.

According to an embodiment, the adapter 142 may be configured so that the first position of the adapter 142 shown in FIG. 1 is suitable to receive the installation of a detachable child safety seat or a detachable child stroller seat in a rearward facing position and a forward facing position, and the second position of the adapter 142 shown in FIG. 2 is suitable to only receive the installation of a detachable child safety seat in a rearward facing position and a forward facing position. The adapter 142 has no opening functionally equivalent to the opening 154 for engagement with a detachable child stroller seat in the second position shown in FIG. 2, so that no child stroller seat can be installed on the adapter 142 when it is in the second position.

Figure 4:
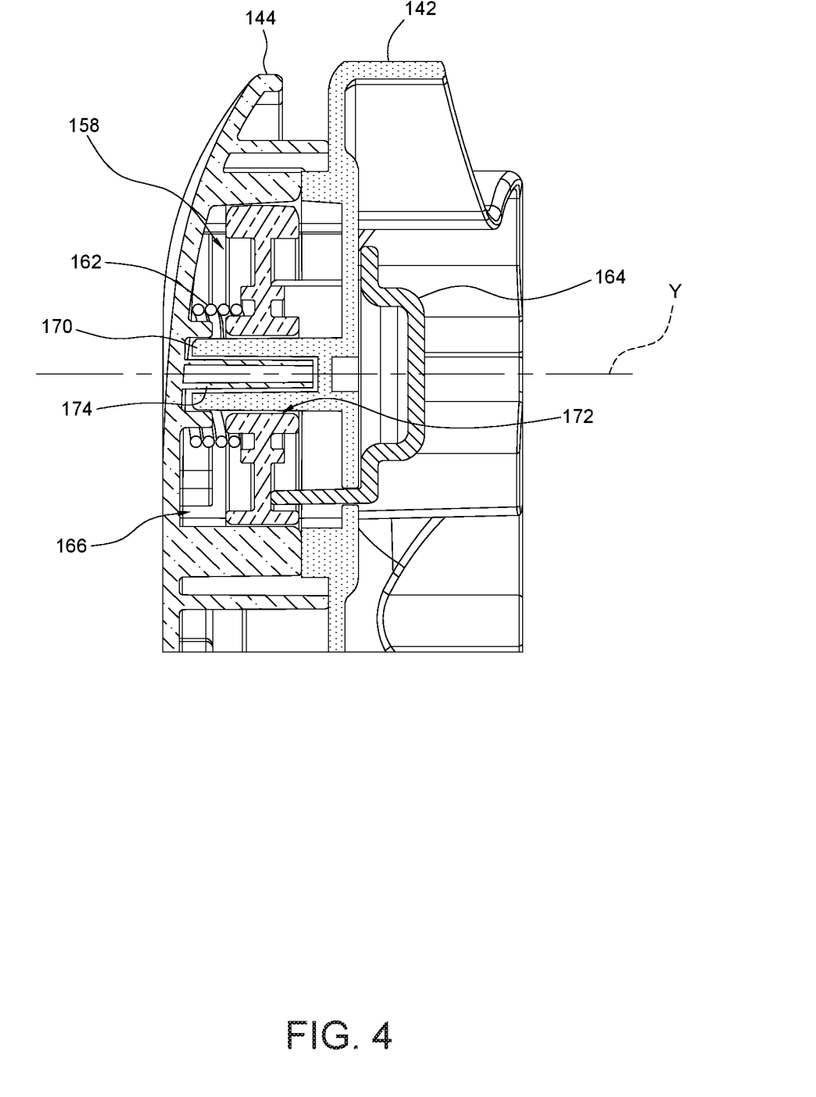
FIG. 4 is a schematic cross-sectional view illustrating a latch mechanism associated with the adapter shown in FIG. 3 in an unlocked state.
Figure 5:
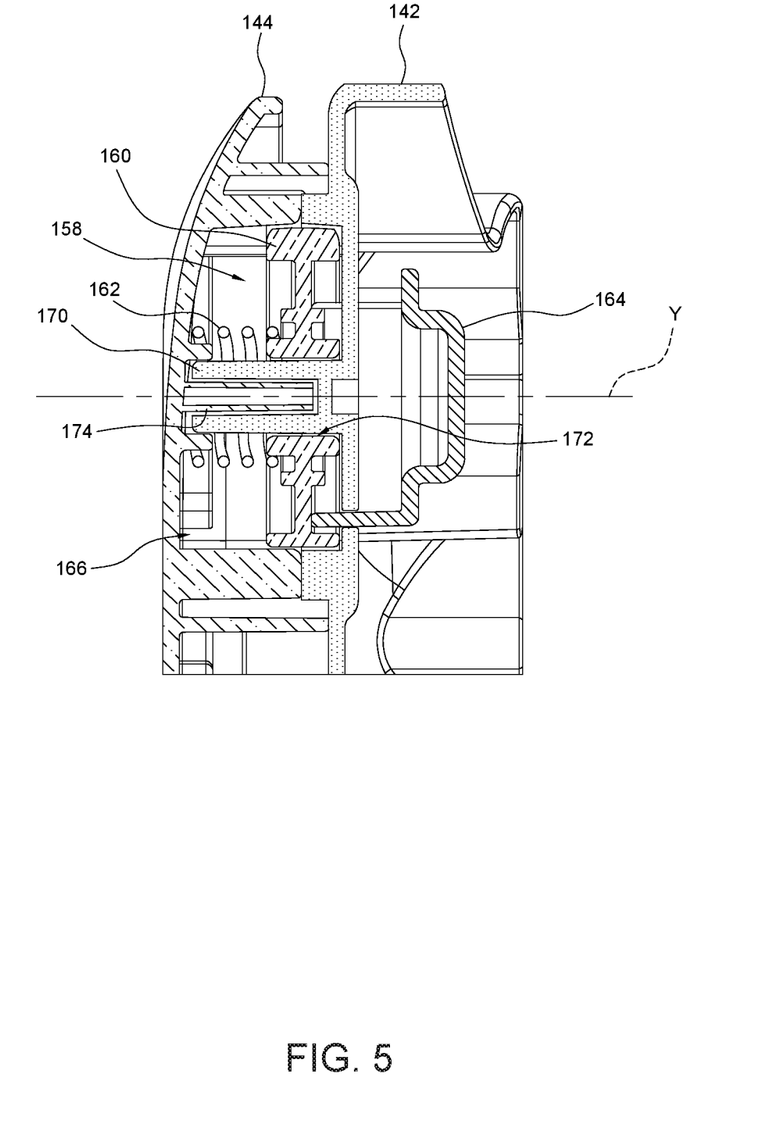
FIG. 5 is a schematic cross-sectional view illustrating the latch mechanism in a locked state.
Figure 6:
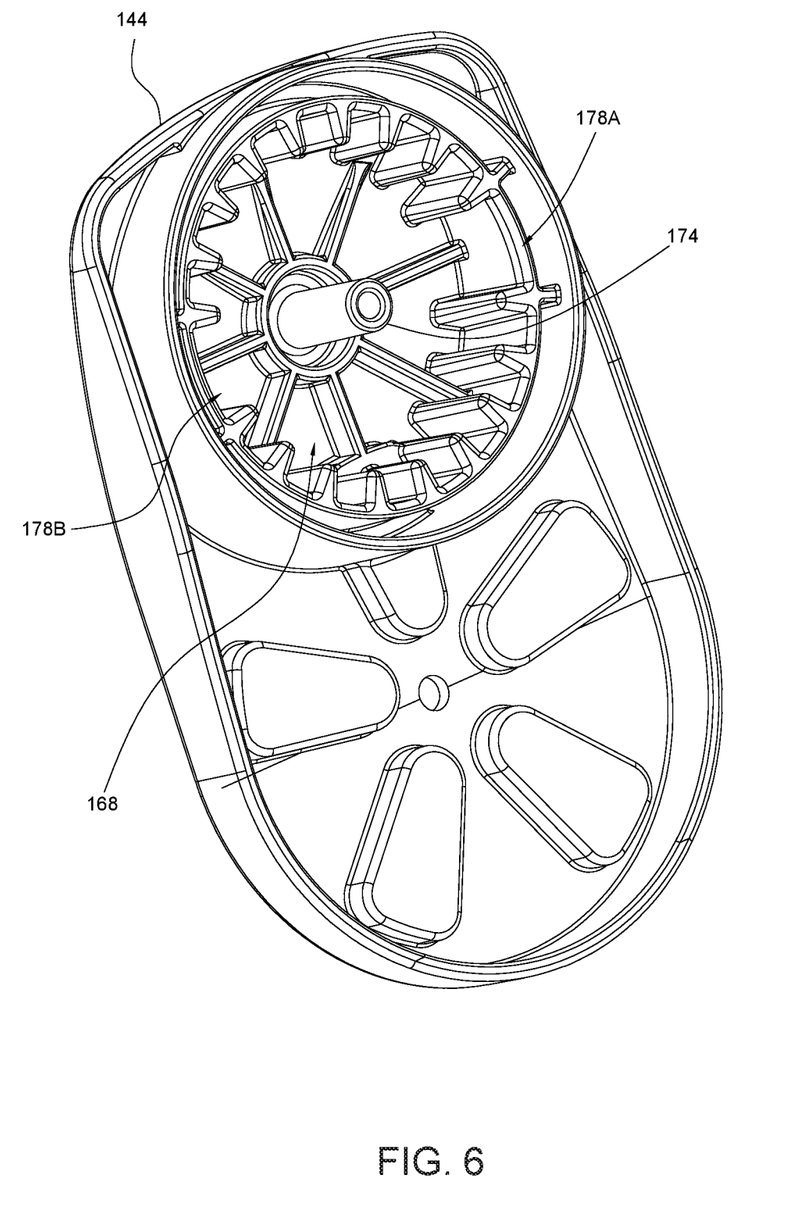
FIG. 6 is a perspective view illustrating some construction details of a support bracket to which the adapter shown in FIG. 3 is pivotally connected.
Figure 7:
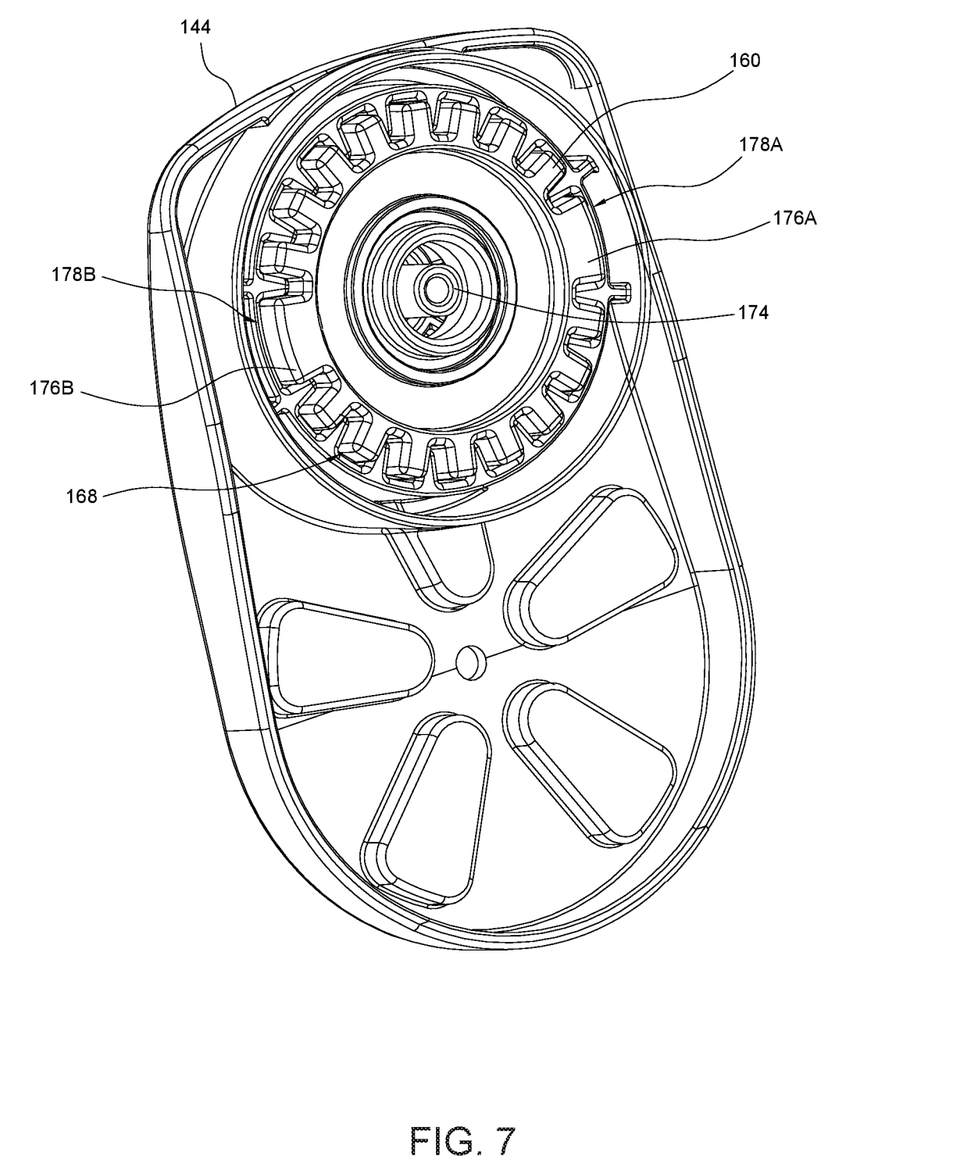
FIG. 7 is a perspective view illustrating a portion of the latch mechanism assembled with the support bracket.
Figure 8:
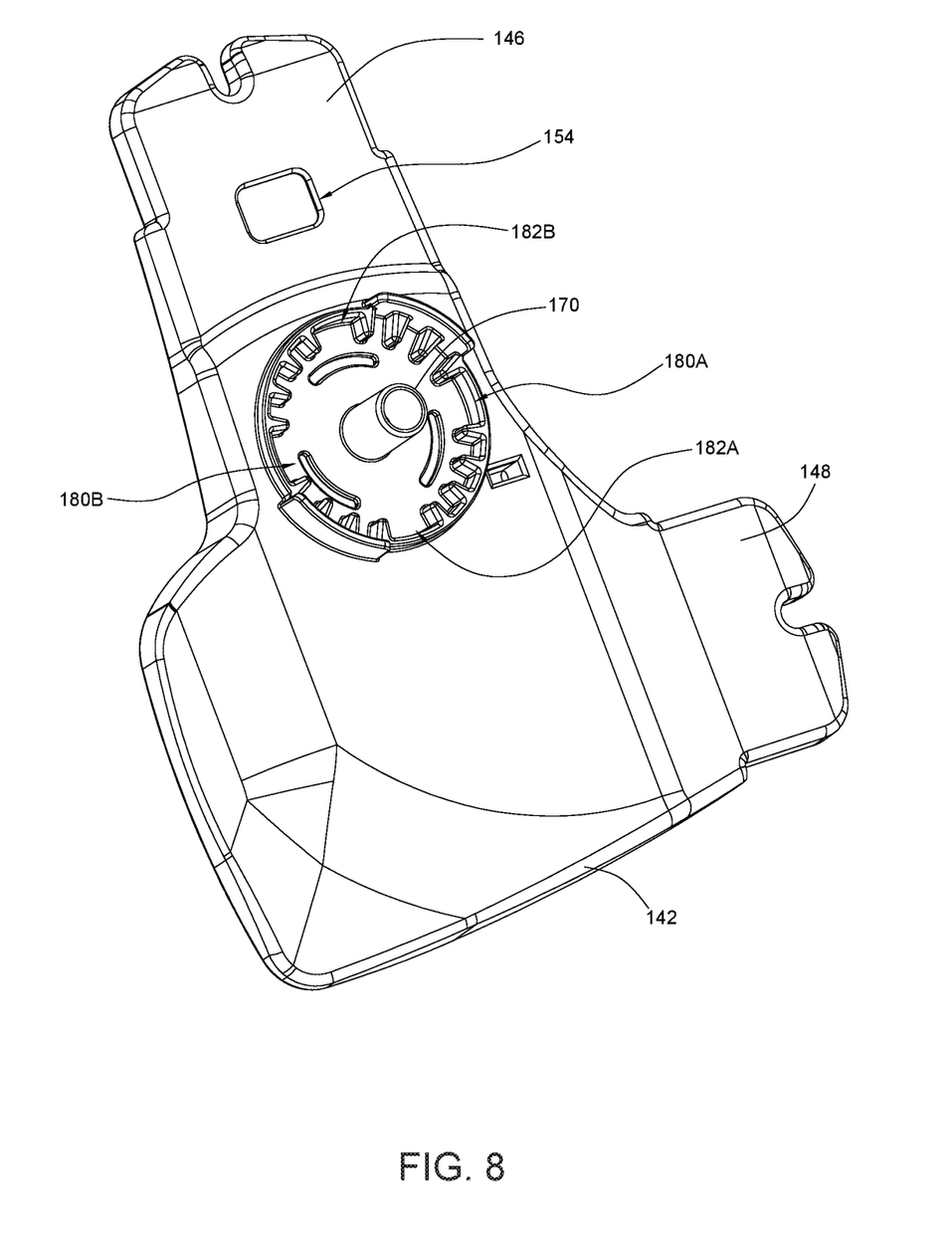
FIG. 8 is a perspective view illustrating further construction details of the adapter shown in FIG. 3.

In conjunction with FIGS. 1-3, FIGS. 4-8 are various views illustrating a latch mechanism 158 for locking the adapter 142 in any of the first position shown in FIG. 1 and the second position shown in FIG. 2. More specifically, FIG. 4 is a schematic cross-sectional view illustrating the latch mechanism 158 in an unlocked state. FIG. 5 is a schematic cross-sectional view illustrating the latch mechanism 158 in a locked state. FIG. 6 is a perspective view illustrating some construction details of the support bracket 144. FIG. 7 is a perspective view illustrating a portion of the latch mechanism 158 assembled with the support bracket 144. FIG. 8 is a perspective view illustrating some construction details of the adapter 142 that is pivotally connected with the support bracket 144. Referring to FIGS. 4-8, the latch mechanism 158 can include a latch 160, a spring 162 and a release actuator 164.

The latch 160 can be assembled in a cavity 166 delimited at least partially by the adapter 142 and the support bracket 144. For example, the support bracket 144 can include a receiving pocket 168 (better shown in FIG. 6), and the adapter 142 can be pivotally connected with the support bracket 144 adjacent to the receiving pocket 168 so as to define at least partially the cavity 166. The latch 160 is movable in the cavity 166 between a locking position where it can rotationally lock the adapter 142 in any of the aforementioned first and second positions with respect to the support bracket 144, and an unlocking position allowing rotation of the adapter 142 relative to the support bracket 144 between the first and second positions.

According to an example of construction, the latch 160 may be slidably supported by a central post 170 that is fixedly connected with the adapter 142. For example, the central post 170 may extend through a hole 172 provided in the latch 160. The adapter 142 and the support bracket 144 can be pivotally connected with each other about the pivot axis Y by assembling an inner shaft 174 fixedly connected with the support bracket 144 through an interior of the central post 170. The latch 160 can thereby slide along the pivot axis Y between the locking position and the unlocking position. In the locking position, the latch 160 is engaged with the adapter 142 and the support bracket 144 to prevent relative rotation between the adapter 142 and the support bracket 144 and thereby lock the adapter 142 in the first position shown in FIG. 1 or the second position shown in FIG. 2. In the unlocking position, the latch 160 is disengaged from the adapter 142 so as to allow its rotation relative to the support bracket 144 between the first and second positions. FIG. 4 illustrates the latch 160 in the unlocking position, and FIG. 5 illustrates the latch 160 in the locking position.

Referring to FIGS. 4-8, the latch 160 includes one or more teeth that can engage with corresponding grooves provided in the adapter 142 and the receiving pocket 168 of the support bracket 144 to lock the adapter 142 in the first or second position. For example, the latch 160 can include two teeth 176A and 176B disposed at a periphery of the latch 160. The two teeth 176A and 176B of the latch 160 are respectively received in two grooves 178A and 178B provided in the receiving pocket 168 of the support bracket 144, and can engage with or disengage from multiple grooves 180A, 180B, 182A and 182B provided in the adapter 142 at different radial directions relative to the central post 170. For example, the two teeth 176A and 176B can respectively engage with the two grooves 180A and 180B in the adapter 142 to lock the adapter 142 in the first position shown in FIG. 1, and respectively engage with the two grooves 182A and 182B in the adapter 142 to lock the adapter 142 in the second position shown in FIG. 2.

Referring to FIGS. 4 and 5, the spring 162 can be provided to bias the latch 160 toward the locking position. The spring 162 can be disposed around the central post 170, and can have two opposite ends respectively connected with the latch 160 and the support bracket 144.

Referring to FIGS. 1, 2, 4 and 5, the release actuator 164 is assembled with the adapter 142, and is operable to contact and urge the latch 160 to move along the pivot axis Y from the locking position to the unlocking position. According to an example of construction, the release actuator 164 may be a single part, and can be exposed for operation on the adapter 142 at an inner side of the push handle frame 106. When the release actuator 164 is depressed, the release actuator 164 can urge the latch 160 to move to the unlocking position.

In conjunction with FIGS. 1 and 2, FIGS. 9-12 are various side views illustrating exemplary configurations of the child stroller apparatus 100 in an unfolded state with detachable child seats installed in different positions on the stroller frame 101. When the child stroller apparatus 100 is in the unfolded state, the pivot connection 122 is located above the pivot connection 120 and below the pivot connection 132, and the pivot connection 130 is located below the pivot connection 120. Moreover, the pivot connections 120, 130 and 132 can form three apexes of a triangle with the pivot connection 122 located adjacent to the side of the triangle joining the respective apexes of the pivot connections 120 and 132. While the child stroller apparatus 100 is in the unfolded state, the adapters 140 and/or 142 may respectively receive the installation of a detachable part.

Figure 9:
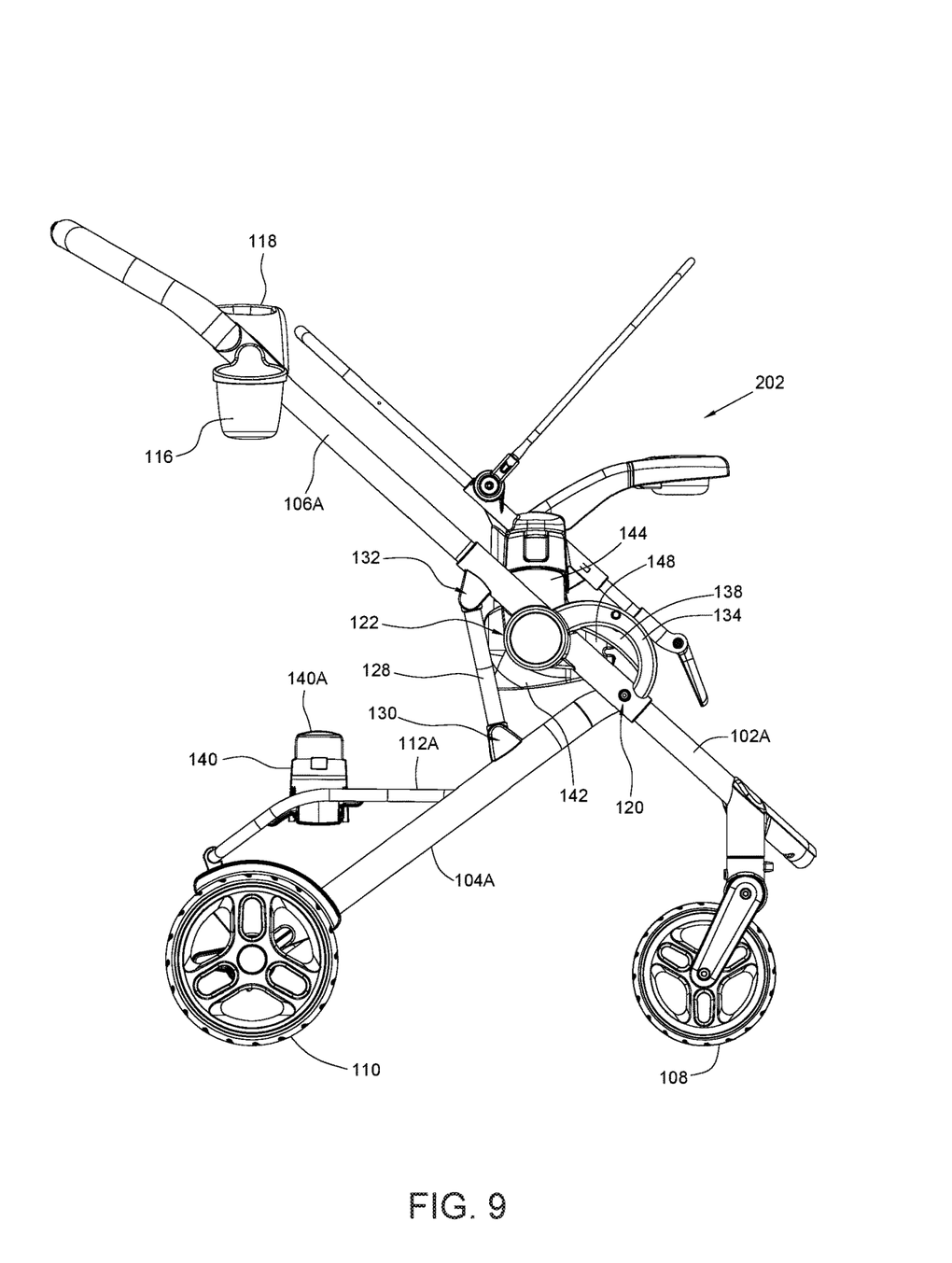
FIGS. 9-12 are various side views illustrating exemplary configurations of the child stroller apparatus in an unfolded state with detachable child seats installed in different positions on the stroller frame.

In FIG. 9, the child stroller apparatus 100 is in the unfolded state with the adapters 142 in the first position, and a child stroller seat 202 is installed on the adapters 142 in a forward facing position.

Figure 10:
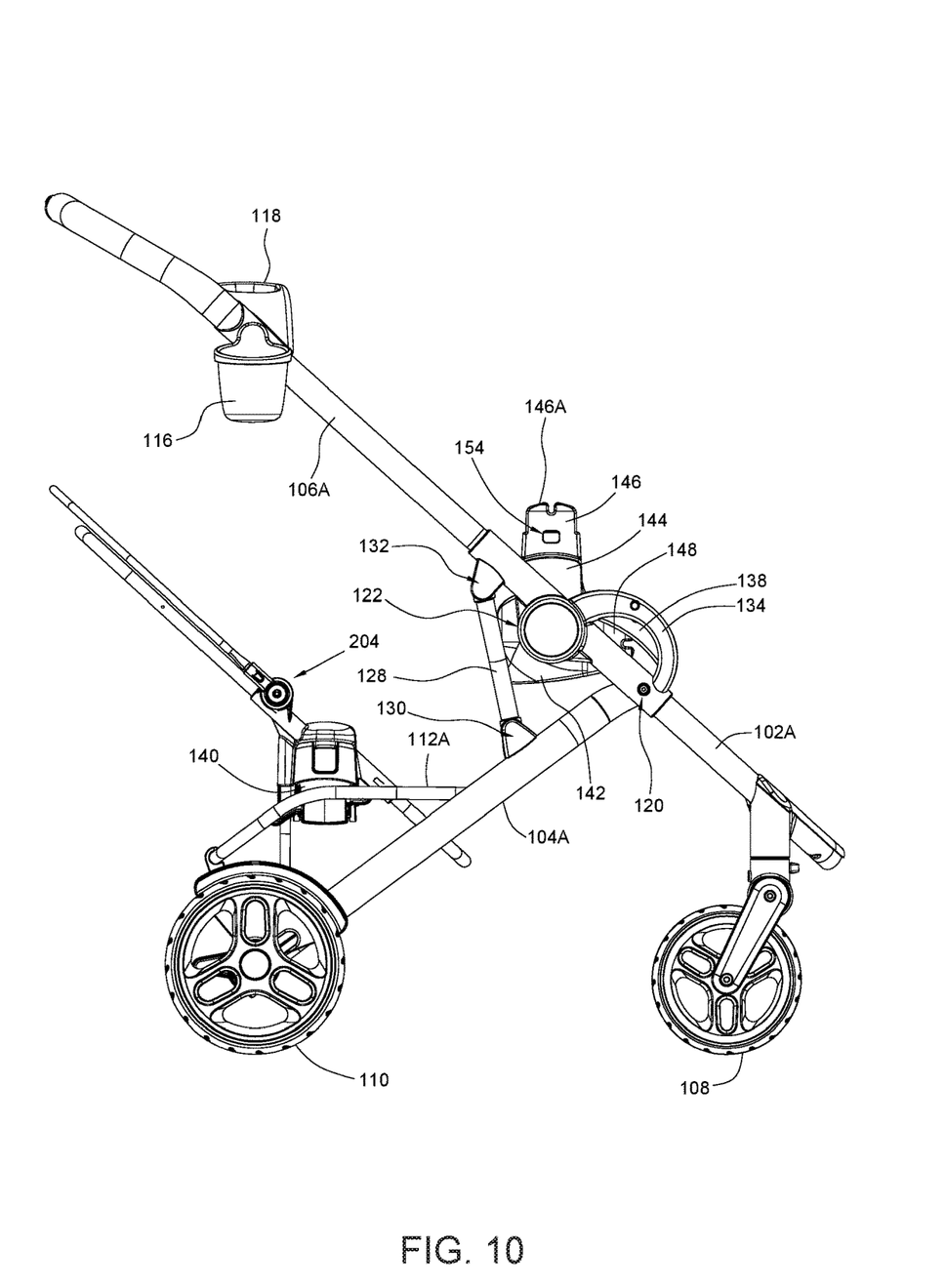

In FIG. 10, the child stroller apparatus 100 is in the unfolded state with the adapters 140 in the use position, and a child stroller seat 204 is installed on the adapters 140 in a forward facing position.

Figure 11:
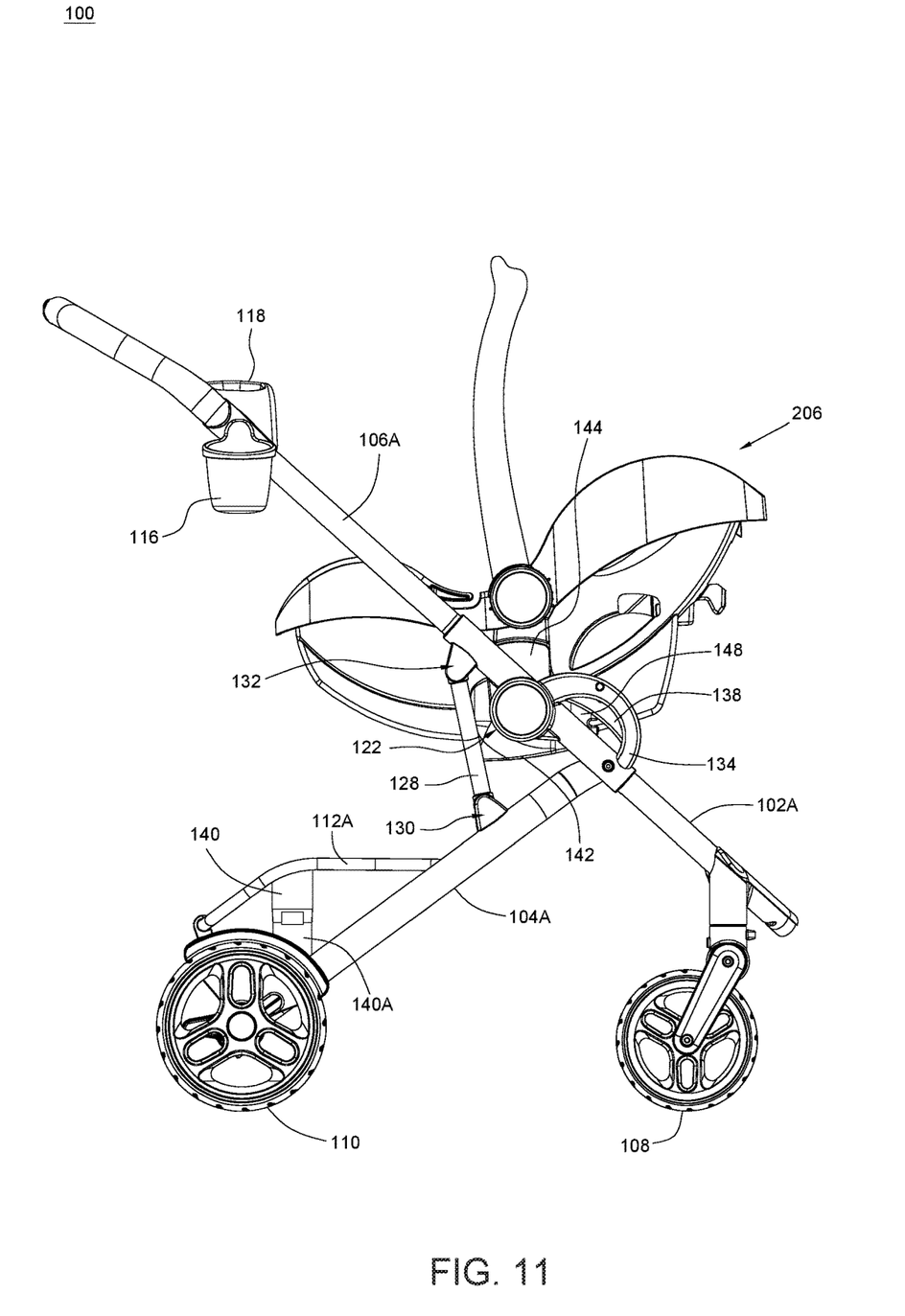

In FIG. 11, the child stroller apparatus 100 is in the unfolded state with the adapters 142 in the first position, and a child safety seat 206 is installed on the adapters 142 in a rearward facing position.

Figure 12:
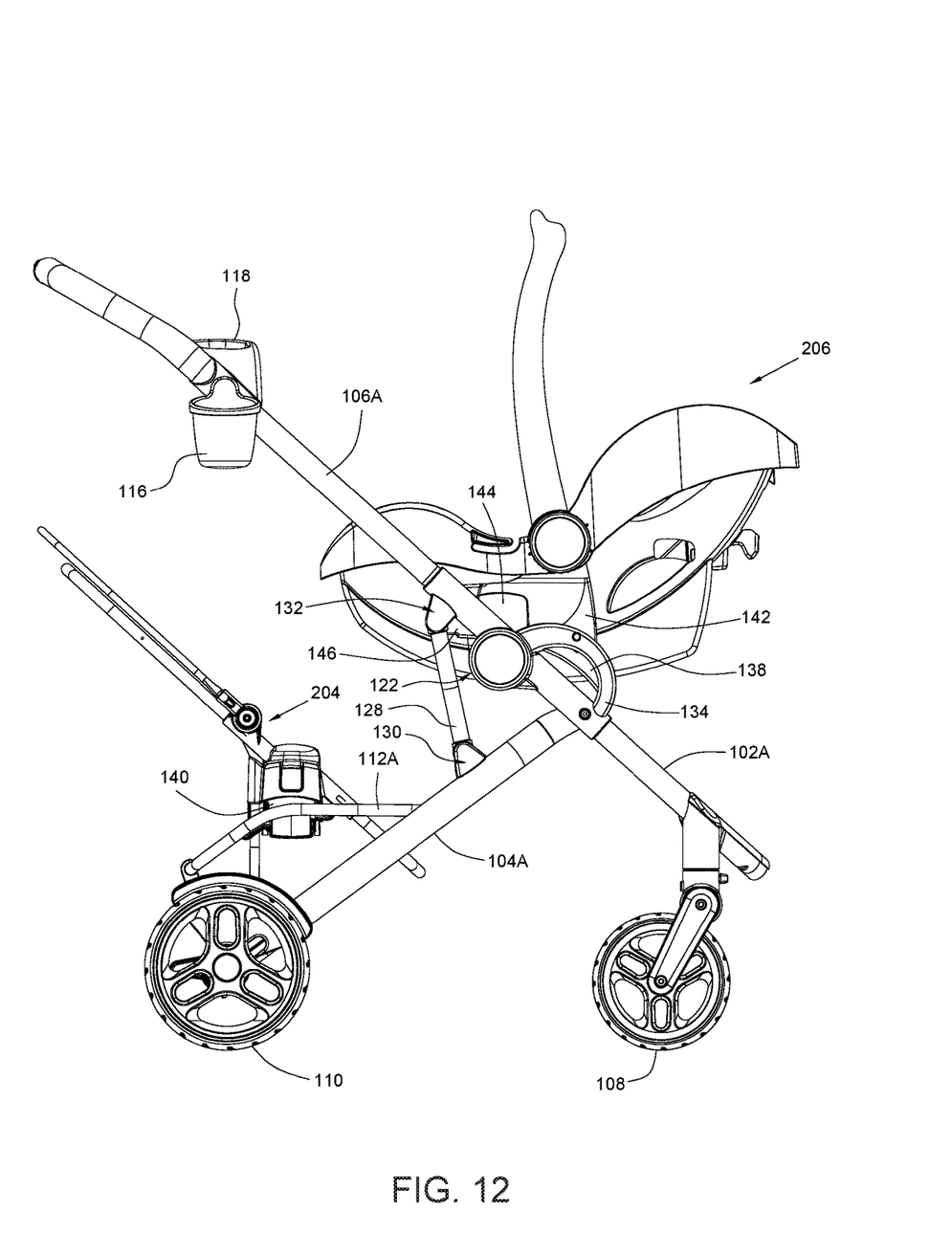

In FIG. 12, the child stroller apparatus 100 is in the unfolded state with the adapters 140 in the use position and the adapters 142 in the second position (as shown in FIG. 2), and a child stroller seat 204 and a child safety seat 206 are respectively installed on the adapters 140 and the adapters 142 in a forward facing position and a rearward facing position.

It will be appreciated that FIGS. 9-12 show some examples of configurations for illustration only, and other configurations of installation may be implemented with the mount system described herein.

Advantages of the structures described herein include the ability to provide a child stroller apparatus that is convenient to operate, and has a configurable mount system allowing the installation of one or more detachable child seats or other types of detachable parts as desired. Accordingly, the child stroller apparatus can offer more flexibility in use.

Realization of the child stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:
1. A child stroller apparatus comprising:
   a stroller frame; and
   an adapter assembled with the stroller frame and having
      a first coupling portion and a second coupling portion, the adapter being pivotally connected with the stroller frame about a pivot axis extending transversally from a left side to a right side of the stroller frame, and the first and second coupling portions protruding in different directions, each of the first and second coupling portions being configurable as a mount for installation of a detachable part;

wherein the adapter is rotatable relative to the stroller frame to displace the first and second coupling portions in a concurrent manner for modifying an orientation of the first and second coupling portions, a first position of the adapter configuring the first coupling portion as the mount while maintaining an angle between the first coupling portion and the second coupling portion, and a second position of the adapter configuring the second coupling portion as the mount while maintaining the angle between the first coupling portion and the second coupling portion, a top of the second coupling portion in the second position of the adapter being at a substantially same height as a top of the first coupling portion in the first position of the adapter.

2. The child stroller apparatus according to claim 1, wherein the adapter including the first and second coupling portions is a unitary part.

3. The child stroller apparatus according to claim 1, wherein the first coupling portion protrudes upward in the first position, and the second coupling portion protrudes upward in the second position, the adapter in the first and second position being engageable with a detachable child seat installed in a rearward or a forward facing position.

4. The child stroller apparatus according to claim 1, wherein the mount formed by the second coupling portion in the second position of the adapter is located forward relative to the mount formed by the first coupling portion in the first position of the adapter.

5. The child stroller apparatus according to claim 1, wherein the adapter is rotatable about 90 degrees between the first and second position.

6. The child stroller apparatus according to claim 1, wherein the first coupling portion extends along a radial direction relative to the pivot axis, and the second coupling portion protrudes at a side of the first coupling portion.

7. The child stroller apparatus according to claim 1, wherein the adapter is locked in the first and second positions with a latch that is assembled for sliding movement along the pivot axis, the latch being movable between a locking position where the latch is engaged with and locks the adapter in either of the first and second position, and an unlocking position where the latch is disengaged from the adapter for rotation of the adapter between the first and second position.

8. The child stroller apparatus according to claim 7, wherein the latch includes at least one tooth, the tooth being engageable with the adapter to lock the adapter in the first or second position.

9. The child stroller apparatus according to claim 7, wherein the latch is connected with a spring, the spring biasing the latch toward the locking position.

10. The child stroller apparatus according to claim 7, wherein the adapter is assembled with a release actuator exposed for operation, the release actuator being operable to urge the latch to slide along the pivot axis from the locking position to the unlocking position.

11. The child stroller apparatus according to claim 1, wherein the stroller frame includes a front leg frame having a first side segment, a push handle frame having a second side segment that is pivotally connected with the first side segment, a rear leg frame having a third side segment pivotally connected with the first side segment, and a linking bar respectively connected pivotally with the second side segment and the third side segment, the adapter being pivotally assembled with the second side segment.

12. The child stroller apparatus according to claim 11, wherein the rear leg frame is further connected with a rear support frame, the rear support frame being assembled with a second adapter configured to receive the installation of a detachable child seat.

13. The child stroller apparatus according to claim 12, wherein the second adapter is pivotally connected with the rear support frame and has a third coupling portion adapted to engage with a detachable child seat, the second adapter being rotatable between a use position where the third coupling portion protrudes upward and an unused position where the third coupling portion protrudes downward.

14. The child stroller apparatus according to claim 1, wherein the adapter is configured so that the first position of the adapter is suitable to receive the installation of at least a detachable child safety seat or a detachable child stroller seat in a rearward facing position and a forward facing position, and the second position of the adapter is suitable to only receive the installation of a detachable child safety seat in a rearward facing position and a forward facing position.

15. The child stroller apparatus according to claim 1, wherein the first coupling portion has an axis of symmetry, and the adapter includes two first openings at two sides of the axis of symmetry of the first coupling portion that are used for engagement with a detachable child safety seat when the adapter is in the first position, the two openings being located below the pivot axis of the adapter when the child stroller apparatus is in an unfolded state for use with the adapter in the first position.

16. A child stroller apparatus comprising:
a stroller frame; and
a first and a second adapter respectively assembled with the stroller frame at a front and a rear position, the first adapter being pivotally connected with the stroller frame about a pivot axis extending transversally from a left side to a right side of the stroller frame, each of the first and second adapter being respectively connectible with a detachable child seat placed in a rearward facing position or a forward facing position;
wherein the first adapter has a first coupling portion and a second coupling portion protruding in different directions, each of the first and second coupling portions being configurable as a mount for installation of a detachable child seat, the first adapter being rotatable relative to the stroller frame to displace the first and second coupling portions in a concurrent manner for modifying an orientation of the first and second coupling portions, a first position of the first adapter configuring the first coupling portion as the mount while maintaining an angle between the first coupling portion and the second coupling portion, and a second position of the first adapter configuring the second coupling portion as the mount while maintaining the angle between the first coupling portion and the second coupling portion, a top of the second coupling portion in the second position of the first adapter being at a substantially same height as a top of the first coupling portion in the first position of the first adapter.

17. The child stroller apparatus according to claim 16, wherein the first adapter including the first and second coupling portions is a unitary part.

18. The child stroller apparatus according to claim 16, wherein the first coupling portion protrudes upward in the first position, and the second coupling portion protrudes upward in the second position, the first adapter in the first and second position being engageable with a detachable child seat installed in a rearward or a forward facing position.

19. The child stroller apparatus according to claim 16, wherein the mount formed by the second coupling portion in the second position of the first adapter is located forward relative to the mount formed by the first coupling portion in the first position of the first adapter.

20. The child stroller apparatus according to claim 16, wherein the first adapter is rotatable about 90 degrees between the first and second position.

21. The child stroller apparatus according to claim 16, wherein the first coupling portion extends along a radial direction relative to the pivot axis, and the second coupling portion protrudes at a side of the first coupling portion.

22. The child stroller apparatus according to claim 16, wherein the first adapter is locked in the first and second positions with a latch that is assembled for sliding movement along the pivot axis, the latch being movable between a locking position where the latch is engaged with and locks the first adapter in either of the first and second position, and an unlocking position where the latch is disengaged from the first adapter for rotation of the first adapter between the first and second position.

23. The child stroller apparatus according to claim 22, wherein the latch includes a plurality of teeth, the teeth being engageable with the first adapter to lock the first adapter in the first or second position.

24. The child stroller apparatus according to claim 22, wherein the latch is connected with a spring, the spring biasing the latch toward the locking position.

25. The child stroller apparatus according to claim 22, wherein the first adapter is assembled with a release actuator exposed for operation, the release actuator being operable to urge the latch to slide along the pivot axis from the locking position to the unlocking position.

26. The child stroller apparatus according to claim 16, wherein the first adapter is disposed higher than the second adapter on the stroller frame.

27. The child stroller apparatus according to claim 16, wherein the stroller frame includes a front leg frame having a first side segment, a push handle frame having a second side segment that is pivotally connected with the first side segment, a rear leg frame having a third side segment pivotally connected with the first side segment, and a linking bar respectively connected pivotally with the second side segment and the third side segment, the first adapter being pivotally assembled with the second side segment.

28. The child stroller apparatus according to claim 27, wherein the rear leg frame is further connected with a rear support frame, the second adapter being assembled with the rear support frame.

29. The child stroller apparatus according to claim 15, wherein the second coupling portion has an axis of symmetry, and the adapter further includes two second openings at two sides of the axis of symmetry of the second coupling portion that are used for engagement with a detachable child safety seat when the adapter is in the second position, the two second openings being located below the pivot axis of the adapter when the child stroller apparatus is in an unfolded state for use with the adapter in the second position.

30. A child stroller apparatus comprising:
a stroller frame including a front leg frame having a first side segment, a push handle frame having a second side segment that is pivotally connected with the first side segment, a rear leg frame having a third side segment pivotally connected with the first side segment, and a linking bar respectively connected pivotally with the second side segment and the third side segment, the rear leg frame further being connected with a rear support frame;
a first adapter pivotally assembled with the second side segment and having a first coupling portion and a second coupling portion, each of the first and second coupling portions being configurable as a mount for installation of a detachable part; and
a second adapter pivotally connected with the rear support frame and having a third coupling portion adapted to engage with a detachable child seat;
wherein the first adapter is movable relative to the stroller frame to displace the first and second coupling portions, a first position of the first adapter configuring the first coupling portion as the mount while maintaining an angle between the first coupling portion and the second coupling portion, and a second position of the first adapter configuring the second coupling portion as the mount while maintaining the angle between the first coupling portion and the second coupling portion; and
wherein the second adapter is rotatable between a use position where the third coupling portion protrudes upward and an unused position where the third coupling portion protrudes downward.

* * * * *